(12) United States Patent
Hirai et al.

(10) Patent No.: US 8,271,711 B2
(45) Date of Patent: Sep. 18, 2012

(54) PROGRAM STATUS DETECTING APPARATUS AND METHOD

(75) Inventors: Akira Hirai, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 12/856,010

(22) Filed: Aug. 13, 2010

(65) Prior Publication Data

US 2011/0041014 A1  Feb. 17, 2011

(30) Foreign Application Priority Data

Aug. 17, 2009  (JP) .................................. 2009-188219

(51) Int. Cl.
*G06F 13/24* (2006.01)

(52) U.S. Cl. ..... 710/260; 714/47.1; 714/47.2; 714/47.3; 702/186; 718/100; 712/244; 711/202; 711/205; 711/207

(58) Field of Classification Search .................. 710/260; 714/47.1–47.3; 702/186; 718/100; 712/244
See application file for complete search history.

(56) References Cited

U.S. PATENT DOCUMENTS

| 7,783,835 B2 * | 8/2010 | Dombrowski et al. | ........ 711/122 |
| 7,895,382 B2 * | 2/2011 | DeWitt et al. | ................. 710/260 |
| 8,214,628 B2 * | 7/2012 | Hirai et al. | .................... 712/244 |

FOREIGN PATENT DOCUMENTS

JP  2008-257405 A  10/2008

* cited by examiner

*Primary Examiner* — Brian Misiura
(74) *Attorney, Agent, or Firm* — Fujitsu Patent Center

(57) ABSTRACT

A method for a computer including a processor that is capable of counting invalidation of translation lookaside buffers and generating an interrupt at the occurrence of the invalidation, the invalidation being performed by an operating system upon switching between application programs, includes acquiring identification information of application programs from the operating system and storing the identification information as a first list; detecting an interrupt generated from the processor at the occurrence of switching from a first application program to a second application program; and when the interrupt is detected, acquiring the identification information of the first and second application programs from the operating system or the mechanism and comparing the acquired identification information with the first list to determine whether either of the first and second application programs is a program that has been created or disappeared.

9 Claims, 8 Drawing Sheets

FIG. 6

| COUNT VALUE | 1 |
|---|---|
| EVENT SETTING | TLB Flash/ Interrupt On/ Every Single Event |

FIG. 7

| PID | PROCESS NAME | ARGUMENT | CREATION TIME | END TIME |
|---|---|---|---|---|
| 18 | prog1 | -t 10 | 10:38:45:831 | |
| 19 | prog2 | | 10:38:45:913 | 10:38:47:162 |
| 48 | prog10 | --stat | 10:41:29:087 | |
| ⋮ | ⋮ | ⋮ | ⋮ | ⋮ |

~27

PROGRAM STATUS DETECTING APPARATUS AND METHOD

CROSS REFERENCES TO RELATED APPLICATIONS

This application is based upon and claims the benefit of priority of prior Japanese Patent Application No. 2009-188219, filed on Aug. 17, 2009, the entire contents of which are incorporated herein by reference.

FIELD

The embodiments discussed herein are related to a technique of detecting the status of a process running on a computer.

BACKGROUND

In a computer system, logging of the addition and removal of programs is performed in order to analyze the operation of the entire computer system or monitor the execution of an unauthorized program (thread or process).

Currently, most central processing units (CPUs) each have a performance monitoring counter that serves as a mechanism for counting an event in the CPU, and communicating the event as a communication or a data exchange with an external device, e.g., the number of clocks, the number of executive instructions, and the number of cache misses. Such a performance monitoring counter has a function of generating an interrupt in a specific or specified vector when detecting a specified event and is capable of acquiring accompanying specified event information at the occurrence of the event.

To monitor the addition or removal of a program in a target computer, the following methods have been used.

(1) The contents of an operating system (OS) are altered so that a log of the addition or removal of a program can be captured. Alternatively, the OS is altered so as to include an interface for enabling logging by an external program.

(2) Programs are monitored at regular intervals using a timer interrupt every 1 ms to detect a newly created program or a disappeared program.

According to the method (1), the OS itself has to be altered. In the use of a commercial OS, there are often restrictions on altering the OS. If the OS is to be altered, functions of the OS itself restrict altering the OS in many cases. According to the method (2), since monitoring is performed at regular intervals, a program which has been created and then disappeared during an interval is not captured. When the monitoring interval is shortened in order to capture a program that is created and disappears within a short period, the overhead of the monitoring process is increased. This detrimentally affects the overall system operation.

SUMMARY

According to one example of an embodiment, a method for a computer including a processor that is capable of counting invalidation of translation lookaside buffers and generating an interrupt at the occurrence of the invalidation, the invalidation being performed by an operating system upon switching between application programs, includes acquiring identification information of application programs from the operating system and storing the identification information as a first list; detecting an interrupt generated from the processor at the occurrence of switching from a first application program to a second application program; and when the interrupt is detected, acquiring the identification information of the first and second application programs from the operating system and comparing the acquired identification information with the first list to determine whether either of the first and second application programs is a program that has been added or removed.

It is to be understood that both the foregoing general description and the following detailed description are exemplary and explanatory and are not restrictive of the invention, as claimed.

BRIEF DESCRIPTION OF THE DRAWINGS

FIG. 6 illustrates a setting for a performance monitoring counter in an embodiment;

FIG. 7 illustrates logging data in an embodiment; and

DETAILED DESCRIPTION OF EMBODIMENTS

Embodiments will be described below. In the following description, an object to be logged is a process. The disclosed embodiments may also be applied to a thread and a task.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 1:
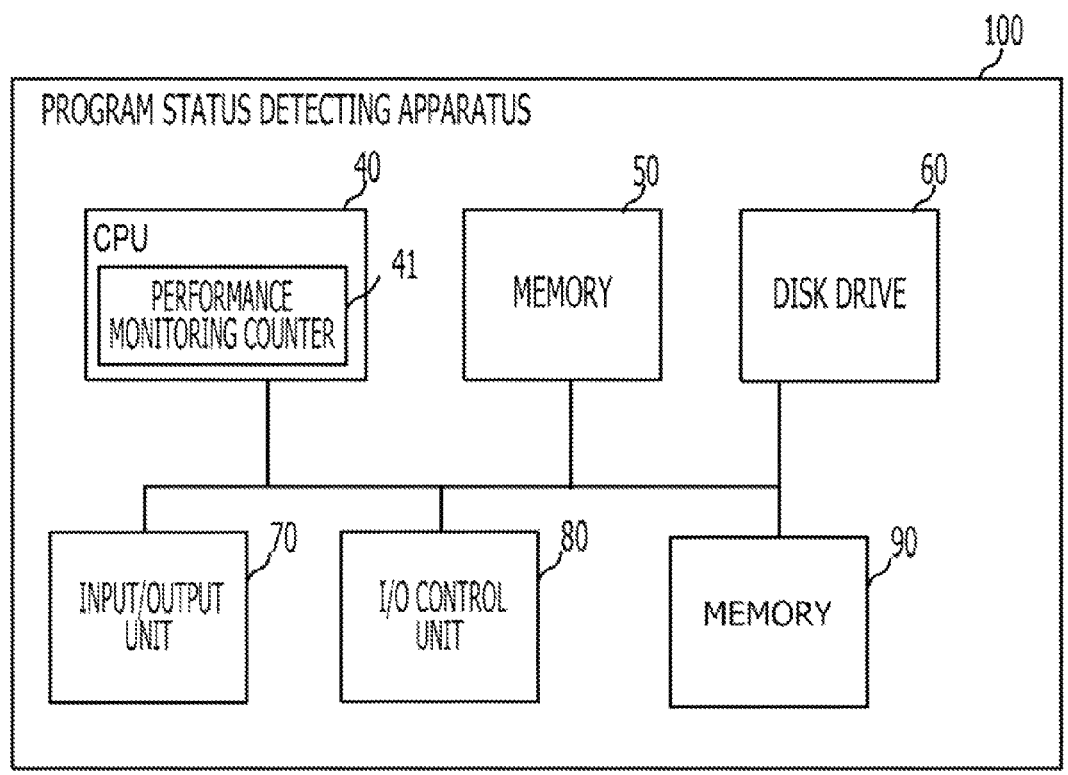
FIG. 1 illustrates a hardware configuration of a program status detecting apparatus according to an embodiment.

FIG. 1 is a schematic diagram illustrating a hardware configuration of a program status detecting apparatus according to an embodiment. The program status detecting apparatus (information processing apparatus), indicated as 100, includes a CPU 40, a memory 50, a disk drive 60, an input/output unit 70, an I/O control unit 80, and a non-volatile memory unit 90.

The CPU 40 functions as a central processor which performs arithmetic processing on the basis of a program previously installed in the non-volatile memory unit 90 and controls components of the program status detecting apparatus 100. The CPU 40 includes a performance monitoring counter 41. The performance monitoring counter 41 is capable of counting, as an event to be counted, TLB entry invalidation performed by an OS 30, which is described later, upon switching between processes (hereinafter, also referred to as "process switching"). The performance monitoring counter 41 further has a function of generating an interrupt notification every proposed number of events.

The memory 50 is a volatile memory unit in which the program previously installed in the non-volatile memory unit 90 is developed and data necessary for arithmetic processing by the CPU 40 is stored.

The disk drive 60 reads and/or writes data from/to a removable recording medium. The input/output unit 70 accepts input of data to the program status detecting apparatus 100 from a user through, for example, a keyboard or mouse and provides the result of processing by the CPU 40 to the user through, for example, a monitor or a printer. The I/O control unit 80 controls communication with an external device. The non-volatile memory unit 90 stores data in a non-volatile manner so that data does not disappear even when power is turned off and includes, for example, a hard disk drive and a flash memory.

Figure 2:
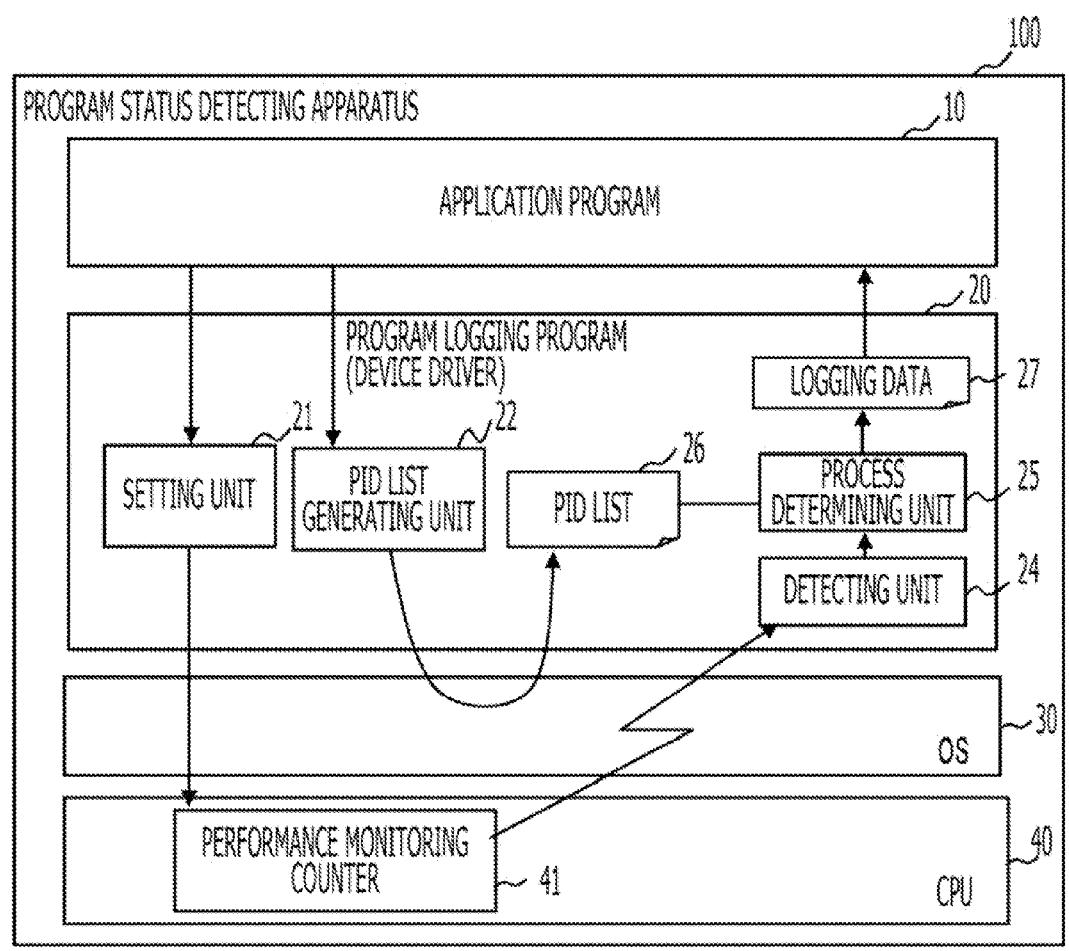
FIG. 2 illustrates a hierarchy and functional blocks of a program status detecting apparatus.

FIG. 2 illustrates a hierarchy and functional blocks of a program status detecting apparatus 100 according to an embodiment. Program status detecting apparatus 100 includes an application program 10, a program logging program (program status detecting program) 20, and a program for the OS 30.

The application program 10 is a higher-level program that instructs the program logging program 20 to start logging, acquires logging data 27 from the program logging program 20, and displays the logging data 27 on the input/output unit 70. The OS 30 is an OS which a device drive may be incorporated into and which may manage storing areas in a paging manner.

The program logging program 20 is a device driver. The program logging program 20 cooperates with hardware resources shown in FIG. 1, e.g., the CPU 40 and the memory 50 to realize a setting unit 21, a PID list generating unit 22, a detecting unit 24, and a process determining unit 25. The setting unit 21, the PID list generating unit 22, the detecting unit 24, and the process determining unit 25 are described below.

The setting unit 21 sets the contents of a setting file which define what events cause an interrupt notification to be generated at the occurrence of the event in the performance monitoring counter 41 on the basis of the setting file. In this described embodiment, it is assumed that the setting file defines that an interrupt notification is generated each time a single event as TLB entry invalidation occurs, for example.

The PID list generating unit 22 acquires a list of identification information (PIDs) of processes running currently from the OS 30 and generates a PID list 26.

The detecting unit 24 detects an interrupt notification generated from the performance monitoring counter 41 at the occurrence of switching between processes.

The process determining unit 25 acquires the PIDs of processes performed before and after switching when the detecting unit 24 detects an interrupt notification, thus determining whether any process has been created before switching or has disappeared after switching. This determination is made on the basis of the comparison between the PID list 26 or a list of PIDs acquired from the OS 30 and the acquired PIDs of the processes performed before and after switching. If any process has been added or removed, the process determining unit 25 outputs data indicating which process has been added or removed as the logging data 27. In addition, if there is a process that has been created, the process determining unit 25 adds the PID of the process to the PID list 26. If there is a process that has disappeared, the process determining unit 25 deletes the PID of the process from the PID list 26.

Since the program logging program 20 is a device driver, the program logging program 20 is dynamically incorporated into the OS 30 without directly altering the program code for the OS 30.

An operation upon program creation, program disappearance, and switching between programs is described below.

To allocate a process to be activated onto the CPU 40, alternatively, to release a program to be terminated from the CPU 40, the OS 30 performs a process of switching between processes which are being performed by the CPU 40.

To create a process, the OS 30 generates management information for allocating resources, e.g., a memory and a file for the process to be created in a management area in the memory 50 and creates a new program space in the memory 50. In addition, the OS 30 loads a program image into the created program space in the memory 50. At this time, information such as an argument is also copied into the program space.

The OS 30 performs a process of switching from the process which is being performed to the newly created process and implements the created process from a start address of the program image. When the process is terminated, the OS 30 releases the used program space and resources used by the management information and switches from the process to another process.

To switch between processes, the OS 30 changes a set value, e.g., the value of a register in the CPU 40 and information peculiar to the currently running process in the OS to values for a process to run next.

Figure 3:
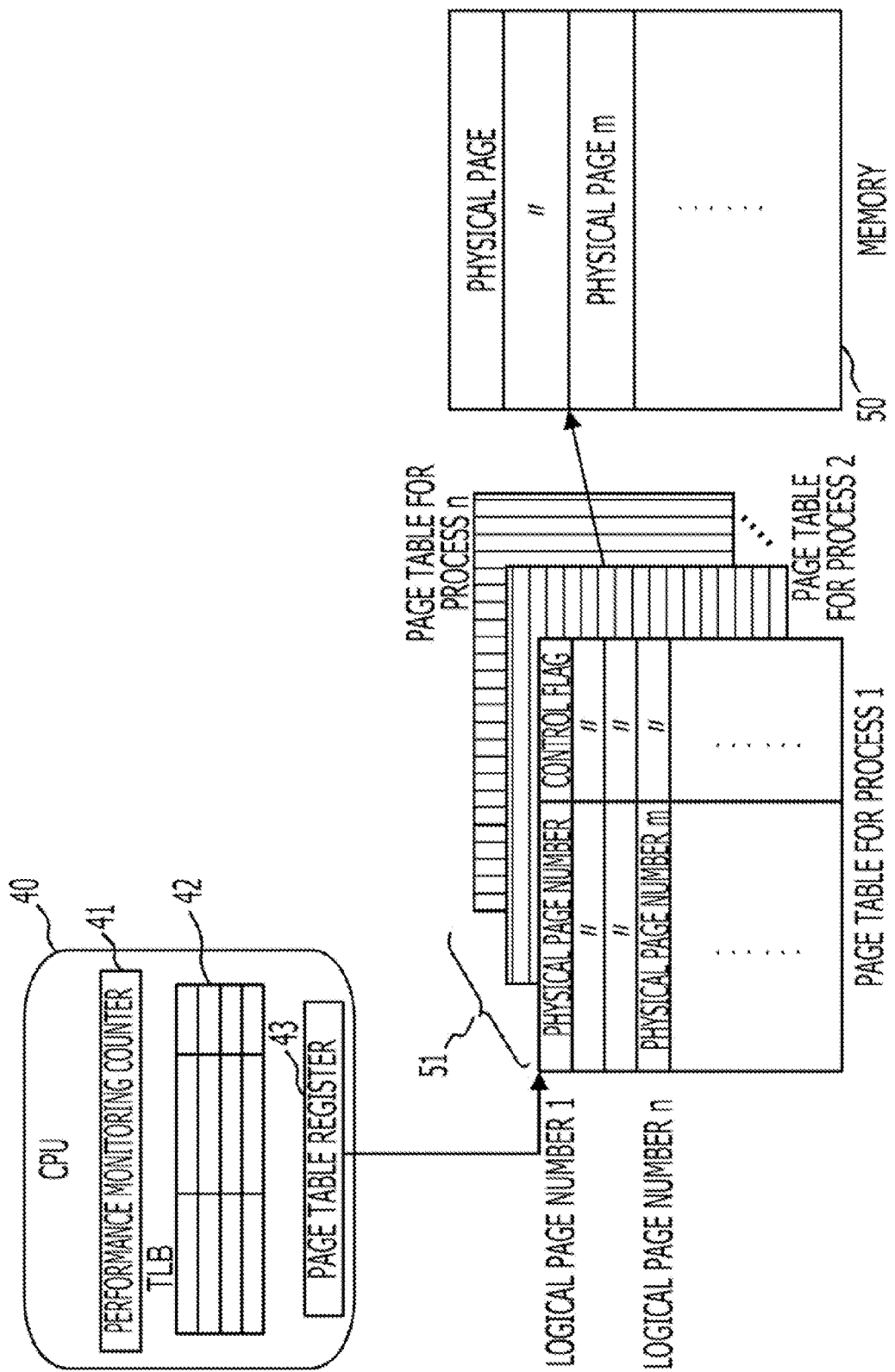
FIG. 3 illustrates data management in a paging manner, a page table register and translation lookaside buffers (TLB) held in a CPU.

Management of storing areas in a paging manner will now be described with reference to FIG. 3. Referring to FIG. 3, the OS 30 provides a page table 51 for each process in the memory 50. Each page table 51 is a table for converting from a virtual address (logical page number) to a physical address (physical page number). Upon switching between processes, the OS 30 switches an address which is held in a page table register 43 in the CPU 40 which is the address of a page table corresponding to the currently running process to another address of a page table corresponding to a process to run next. Furthermore, the OS 30 invalidates an entry to TLB 42 functioning as caches for the page tables in the CPU 40.

The setting unit 21 sets the performance monitoring counter 41 so that the counter 41 detects TLB entry invalidation performed upon switching between processes by the OS 30. The performance monitoring counter 41, set as described above, generates an interrupt notification each time process switching occurs. When acquiring the interrupt notification, the detecting unit 24 detects that process switching has occurred. The process determining unit 25 performs a process of determining whether any program has been added or removed.

An operation of the program status detecting apparatus 100 will now be described with reference to a flowchart of FIG. 4.

Figure 5:
FIG. 5 illustrates a list of identification information of processes in an embodiment.

The program logging program 20 receives a logging start instruction from the application program 10 (block S1). In response to the start instruction, the PID list generating unit 22 in the program logging program 20 acquires PIDs of all of currently running processes from the OS 30 and generates the PID list 26, as illustrated in FIG. 5, in the memory 50 (blockS2).

In response to the logging start instruction from the application program 10, the setting unit 21 sets the performance monitoring counter 41 including a plurality of counter elements so that a counter element counts an event as TLB entry invalidation and starts logging (block S3). FIG. 6 illustrates the contents of a setting for the performance monitoring counter 41. The setting unit 21 sets the performance monitoring counter 41 so that an interrupt is generated each time a single event as TLB entry invalidation ("TLB Flash") occurs, thus validating an interrupt ("Interrupt On"). Since the performance monitoring counter 41 is set in this manner, an interrupt notification is generated each time process switching occurs.

If process switching occurs (YES in block S4), the detecting unit 24 detects the interrupt notification generated by the performance monitoring counter 41 (block S5). The program logging program 20 is in a standby mode (NO in block S4) until process switching occurs.

The process determining unit 25 acquires the PIDs of two processes performed before and after switching, namely, a first process which has been switched to another one and a second process which is switched from the first process (block S6). When the performance monitoring counter 41 manages PIDs, the PIDs of the first and second processes are obtained from the performance monitoring counter 41. When the OS 30 manages PIDs, the PIDs thereof are obtained from the OS 30.

The process determining unit 25 determines whether the PID of the second process performed after switching exists in the PID list 26 (block S7). If the PID of the second process does not exist in the PID list 26 (NO in block S7), the process determining unit 25 determines that the second process is a newly created process and adds the PID of the second process to the PID list 26 (block S8). The process determining unit 25 records accompanying information, e.g., the name of the process, an argument, and information about the time of creation in the logging data 27 (block S9), as illustrated in FIG. 7. After that, the process returns to block S4.

If the PID of the second process exists in the PID list 26 (YES in S7), the process determining unit 25 acquires a list of the PIDs of currently running processes (second list of identification information) from the OS 30 to determine whether the PID of the first process performed before switching exists currently (block S10). If the PID of the first process does not exist currently (NO in block S10), the process determining unit 25 determines that the first process is a disappeared process and deletes the PID of the first process from the PID list 26 (block S11) and records accompanying information, e.g., information about the time of disappearance in the logging data 27 (block S12). The process is then returned to block S4.

In this embodiment, whether a first process performed before switching has disappeared is determined and, after that, the PID of the first process is deleted from the PID list 26. Accordingly, the entry of the PID of the first process exists in the PID list 26 upon this determination. According to this embodiment, therefore, the PID list 26 is not used for the determination in block S10 as to whether the first process performed before switching has disappeared and another list of PIDs is obtained from the OS.

If the PID of the first process performed before switching exists currently (YES in block S10), the process determining unit 25 determines that this process switching is normal switching without the addition and removal of the processes because both the PIDs of the first and second processes performed before and after switching exist currently. Consequently, the process is returned to block S4 without logging.

The program logging program 20 outputs the logging data 27 in response to a request from the application program 10. The process illustrated in FIG. 4 is terminated in accordance with an end instruction obtained from a user or application software.

Although it is conventionally difficult to capture logging data regarding the addition or removal of a program without altering an OS or without taking the accuracy of monitoring or the effect of overhead into consideration, such logging data may be accurately captured according to this embodiment.

Conventional CPUs generally have a performance monitoring counter by which a TLB entry invalidation event can be counted. The method according to this embodiment can be implemented, e.g., by making use of the performance monitoring counter.

Figure 8:
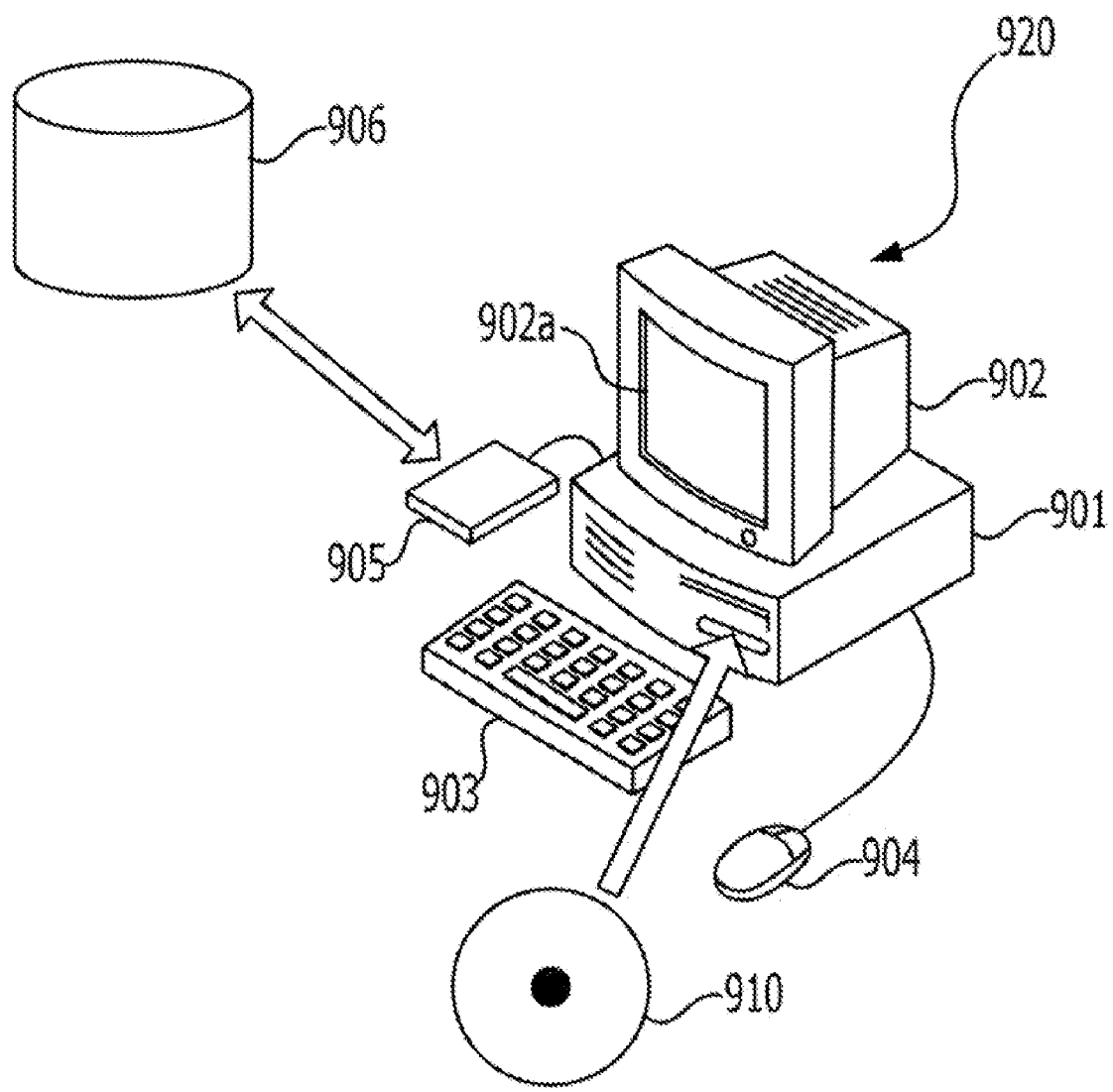
FIG. 8 illustrates a hardware configuration of a computer system that may be used as a program status detecting apparatus according to an embodiment.

FIG. 8 is a diagram illustrating a computer system to which an embodiment may be applied. Referring to FIG. 8, the computer system, indicated as 920, includes a main body 901 in which a CPU and a disk drive are arranged, a display 902 that displays an image in accordance with an instruction from the main body 901, a keyboard 903 for input of various pieces of information to the computer system 920, a mouse 904 that specifies a position on a display screen 902a of the display 902, and a communication device 905 that accesses, for example, an external database to download a program or the like stored in another computer system. The communication device 905 may include a network communication card or a modem.

Figure 4:
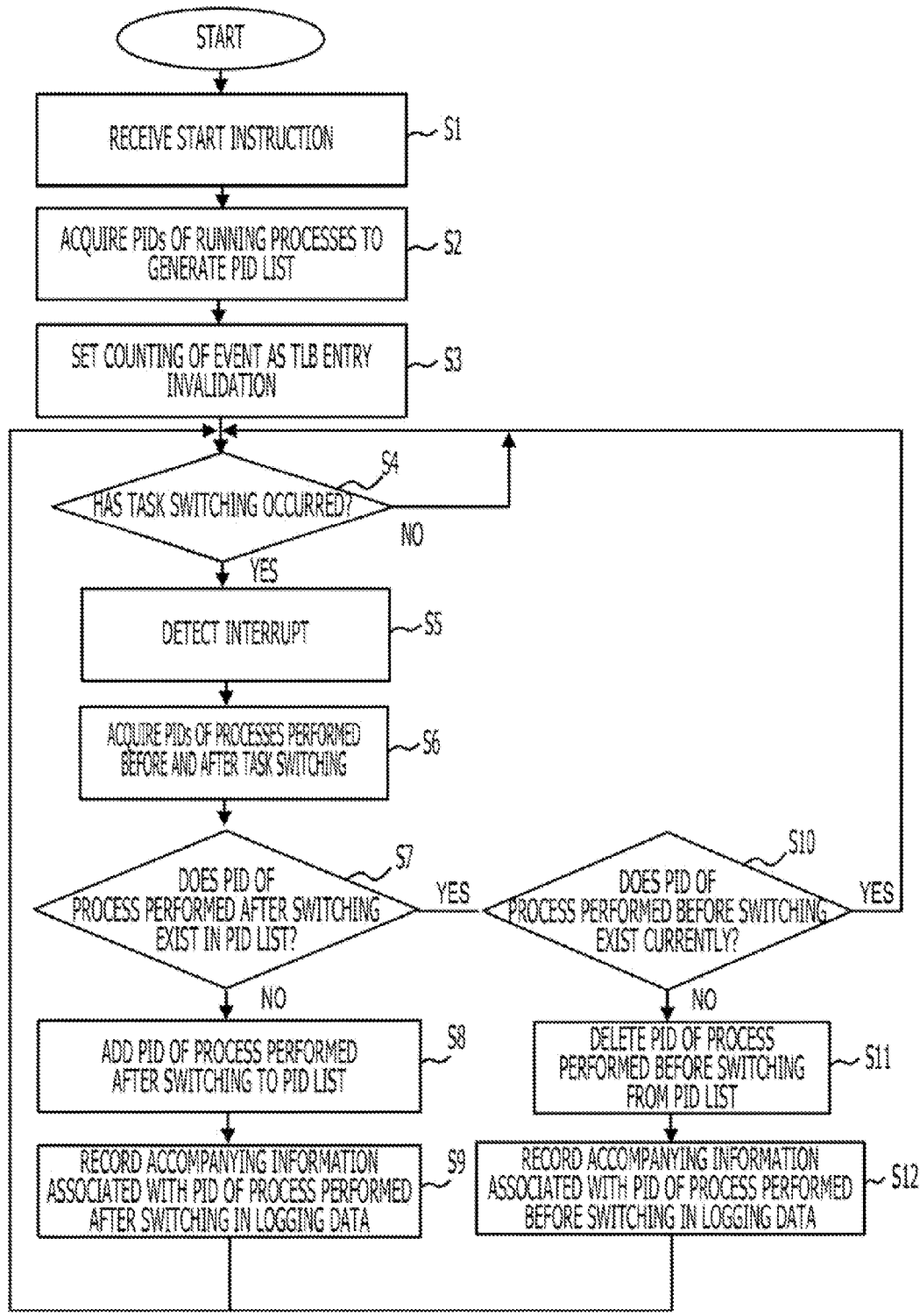
FIG. 4 illustrates an operation of a program status detecting apparatus according to an embodiment.

A program that allows the above-described computer system to serve as a program status detecting apparatus that performs the process illustrated in FIG. 4 may be provided as a program status detecting program. This program is stored into a (non-transitory) recording medium readable by the computer system, so that the program may allow the computer system to perform the process shown in FIG. 4. The program for performing the above-described process is stored in a removable recording medium such as a disk 910 or the like or is downloaded through the communication device 905 from a (non-transitory) recording medium 906 of another computer system. The program status detecting program (program status detecting software) that allows the computer system 920 to have at least a program status detecting function is input to the computer system 920 and is compiled. This program allows the computer system 920 to operate as a program status detecting apparatus having a program status detecting function. This program may be stored in a computer-readable recording medium, e.g., the disk 910. Examples of a recording medium readable by the computer system 920 include an internal memory unit, such as a ROM or a RAM, installed in a computer, a removable storage medium such as the disk 910, a flexible disk, a digital versatile disk (DVD), a magneto-optical disk, or an IC card, a database that stores a computer program, another computer system, the database of the other computer system, and various recording media that can be accessed by a computer system connected through communicating means such as the communication device 905.

According to the above-described embodiments, a program status, e.g., the addition or removal of a program may be determined without altering an OS or without taking into consideration the accuracy of monitoring and/or the effect of overhead. Thus, a log of the addition or removal of a program may be accurately captured. All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A non-transitory recording medium storing a program that causes a computer to execute a process, the computer including a processor that is configured to count an invalidation of translation lookaside buffers and generate an interrupt at an occurrence of the invalidation, the invalidation being performed by an operating system upon switching between application programs, the process comprising:

acquiring an identification information of an application program from the operating system;

storing the identification information in a memory;

detecting an interruption, by the processor, when a first application program is switched to a second application program;

acquiring an identification information of the second application program, upon detection of the interruption; and judging whether the second application program corresponds to an application program to be added or removed from the memory by comparing the identification information of the second application program with the identification information stored in the memory.

2. The non-transitory recording medium according to claim 1, wherein the process further includes, determining the second application program to be a newly added application program when the identification information of the second application program does not exist in a first list, adding the identification information of the second application program to the first list, and recording logging data.

3. The non-transitory recording medium according to claim 1, wherein the process includes:

acquiring a second list of identification information of application programs from the operating system when the identification information of the second application program exists in a first list;

determining that the first application program currently exists and recording no logging data when the identification information of the first application program exists in the second list; and determining that the first application program has been removed from the memory by deleting the identification information of the first application program from the first list, and recording logging data when the identification information of the first application program does not exist in the second list.

4. An information processing apparatus comprising:

a processor that is configured to count an invalidation of translation lookaside buffers and generate an interrupt at an occurrence of the invalidation, the invalidation being performed by an operating system upon switching between application programs, the processor executing a process including:

acquiring identification information of application programs from the operating system and storing the identification information as a first list;

detecting an interrupt generated by the processor at an occurrence of switching from a first application program to a second application program; and acquiring the identification information of the first and second application programs from the operating system and comparing the acquired identification information with the first list to determine whether one of the first and second application programs is a program that has been added or removed, when the interrupt is detected.

5. The apparatus according to claim 4, wherein when the identification information of the second application program does not exist in the first list, a determining unit determines the second application program as a newly added program, adds the identification information of the second application program to the first list, and records logging data.

6. The apparatus according to claim 4, wherein when the identification information of the second application program exists in the first list, the determining unit acquires a second list of identification information of application programs from the operating system, when the identification information of the first application program exists in the acquired second list, the determining unit determines that the first application program currently exists and records no logging data, and when the identification information of the first application program does not exist in the acquired second list, the determining unit determines that the first application program has been removed, deletes the identification information of the first application program from the first list, and records logging data.

7. A program status detecting method performed by a computer that includes a processor that is configured to count an invalidation of translation lookaside buffers and generate an interrupt at an occurrence of the invalidation, the invalidation being performed by an operating system upon switching between application programs, the method comprising:

acquiring identification information of application programs from the operating system and storing the identification information as a first list;

detecting an interrupt generated from the processor at an occurrence of switching from a first application program to a second application program; and acquiring the identification information of the first and second application programs from the operating system and comparing the acquired identification information with the first list to determine whether one of the first and second application programs is a program that has been added or removed, when the interrupt is detected.

8. The method according to claim 7, wherein the method further includes, determining the second application program as a newly added program, adding the identification information of the second application program to the first list, and recording logging data, when the identification information of the second application program does not exist in the first list.

9. The method according to claim 7, wherein the method further includes, acquiring a second list of identification information of application programs from the operating system, when the identification information of the second application program exists in the first list;

determining that the first application program currently exists and recording no logging data, when the identification information of the first application program exists in the second list; and determining that the first application program has been removed, deleting the identification information of the first application program from the first list, and recording logging data, when the identification information of the first application program does not exist in the acquired second list.

* * * * *